United States Patent
Moridaira

(10) Patent No.: US 9,434,430 B2
(45) Date of Patent: Sep. 6, 2016

(54) BIPED WALKING ROBOT CONTROL METHOD AND BIPED WALKING ROBOT CONTROL SYSTEM

(71) Applicant: TOYOTA JIDOSHA KABUSHIKI KAISHA, Toyota-shi, Aichi-ken (JP)

(72) Inventor: Tomohisa Moridaira, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/597,607

(22) Filed: Jan. 15, 2015

(65) Prior Publication Data
US 2015/0202768 A1    Jul. 23, 2015

(30) Foreign Application Priority Data

Jan. 20, 2014   (JP) ................. 2014-007544

(51) Int. Cl.
G05B 15/00       (2006.01)
G05B 19/00       (2006.01)
B62D 57/032      (2006.01)

(52) U.S. Cl.
CPC ............ B62D 57/032 (2013.01); *Y10S 901/01* (2013.01); *Y10S 901/46* (2013.01)

(58) Field of Classification Search
CPC ...... B25J 3/00; B62D 57/032; Y10S 901/01; Y10S 901/46
USPC ............ 700/245, 258, 253, 260; 318/568.11, 318/568.12, 568.16, 568.17
See application file for complete search history.

(56) References Cited

U.S. PATENT DOCUMENTS

| | | | |
|---|---|---|---|
| 5,841,258 A | 11/1998 | Takenaka | |
| 9,162,720 B2* | 10/2015 | Mistry | B62D 57/032 |
| 2007/0016329 A1* | 1/2007 | Herr | B62D 57/032 700/250 |
| 2012/0143374 A1* | 6/2012 | Mistry | B62D 57/032 700/259 |

FOREIGN PATENT DOCUMENTS

| | | |
|---|---|---|
| JP | H10-217159 A | 8/1998 |
| JP | 2003-170374 A | 6/2003 |
| JP | 2010-099418 A | 5/2010 |
| JP | 2012-065723 A | 4/2012 |

OTHER PUBLICATIONS

Chunqian, F. et al., "Force-Shoes ZMP Measuring System for Human Walker," 15th International Conference on Mechatronics and Machine Vision in Practice (M2ViP08), Dec. 2008, pp. 527-532.

* cited by examiner

Primary Examiner — Jaime Figueroa
(74) Attorney, Agent, or Firm — Oliff PLC

(57) ABSTRACT

A biped walking robot control method is for master-slave control of walking of a biped walking robot. The biped walking robot control method includes a weight detection step of detecting weights applied to a ground respectively by a right leg and a left leg of an operator, a target ZMP calculation step of calculating a target ZMP when the biped walking robot produces weights having a ratio of the detected right leg weight and left leg weight, and a control step of controlling the biped walking robot in accordance with the calculated target ZMP.

7 Claims, 15 Drawing Sheets

RAISED LEG HEIGHT

CALCULATE TIME TO LIFT
AND MOVE IDLING LEG

BIPED WALKING ROBOT CONTROL METHOD AND BIPED WALKING ROBOT CONTROL SYSTEM

INCORPORATION BY REFERENCE

This application is based upon and claims the benefit of priority from Japanese patent application No. 2014-007544, filed on Jan. 20, 2014, the disclosure of which is incorporated herein in its entirety by reference.

BACKGROUND OF THE INVENTION

1. Field of the Invention

The present invention relates to a biped walking robot control method and a biped walking robot control system and, particularly, to a technique for master-slave control of a biped walking robot.

2. Description of Related Art

Japanese Unexamined Patent Application Publication No. 10-217159 discloses a remote control system of a legged mobile robot provided with a master device for controlling the legged mobile robot in a master-slave fashion. The master device includes a foot support mechanism that movably supports the foot of an operator, a foot support mechanism driving unit that drives the foot support mechanism, a master-side foot acting force detection means that detects the acting force on the foot of an operator. Further, the legged mobile robot includes a robot-side foot acting force detection means that detects the acting force on the foot of the legged mobile robot from a floor.

The remote control system determines the target position and posture of the foot relative to the upper body of an operator so that the acting force on the foot of the operator and the acting force on the foot of the robot correspond to each other, and controls the foot support mechanism according to the determined target position and posture using the foot support mechanism driving unit. Further, the remote control system determines the target position and posture of the foot relative to the upper body of the robot and controls a leg activation unit in the robot according to the determined target position and posture.

In other words, the remote control system performs control so that the operator and the robot receive the equal acting force on their foot. This allows the operator to recognize the stability or instability of the robot as the stability or instability of him/herself and thereby perform accurate manipulation for the robot to maintain the stability.

SUMMARY OF THE INVENTION

However, the technique disclosed in Patent Literature 1 has a problem that the device needs to be large scale in order to feed back somatic sensation to the operator.

The present invention has been accomplished to solve the above problem and an object of the present invention is thus to provide a biped walking robot control method and a biped walking robot control system that enable intuitive operation of a robot with a simple structure.

A biped walking robot control method according to a first aspect of the present invention is a biped walking robot control method for master-slave control of walking of a biped walking robot, including a weight detection step of detecting weights applied to a ground respectively by a right leg and a left leg of an operator, a target ZMP calculation step of calculating a target ZMP when the biped walking robot produces weights having a ratio of the detected right leg weight and left leg weight, and a control step of controlling the biped walking robot in accordance with the calculated target ZMP. According to this aspect, the operator can intuitively control the weights of the right leg and the left leg of the biped walking robot. Further, because it is only necessary to detect the right leg weight and left leg weight of the operator, the method can be implemented by a simple structure.

Further, the above-described biped walking robot control method may further include a detection step of detecting one step by the operator from a change in the detected right leg weight and left leg weight, and an idling leg trajectory calculation step of calculating an idling leg trajectory for one step of the biped walking robot corresponding to the step by the operator from the right leg weight and left leg weight detected when the one step by the operator ends, and the control step may further control the biped walking robot to walk along the calculated idling leg trajectory. Because it is not necessary to reflect the idling leg trajectory at all times, it is possible to control the biped walking robot in a simple and easy way.

Further, in the above-described biped walking robot control method, the idling leg trajectory calculation step may generate idling leg trajectory information indicating the idling leg trajectory in a size corresponding to an idling leg period of one step by the operator and store the idling leg trajectory information into a buffer, the control step may control the biped walking robot in accordance with the idling leg trajectory indicated by the idling leg trajectory information stored in the buffer, the biped walking robot control method may further include an idling leg period calculation step of calculating an idling leg period of one step by the operator from a change in the detected right leg weight and left leg weight, and when the calculated idling leg period is longer than an upper limit of a time period for storing the idling leg trajectory information into the buffer, the idling leg period calculation step may generate the idling leg trajectory information after correcting the idling leg period to meet the upper limit. It is thereby possible to appropriately control the biped walking robot even when one step of the operator is very long.

Further, the above-described biped walking robot control method may further include an idling leg period calculation step of calculating an idling leg period of one step by the operator from the detected right leg weight and left leg weight, and when the calculated idling leg period is shorter than a lower limit of a time period for the biped walking robot to reproduce one step corresponding to the one step by the operator, the idling leg period calculation step may generate the idling leg trajectory after correcting the idling leg period of the one step by the operator to meet the lower limit. It is thereby possible to appropriately control the biped walking robot even when one step of the operator is very short.

Further, the above-described biped walking robot control method may further include an idling leg period calculation step of calculating an idling leg period of one step by the operator from the detected right leg weight and left leg weight, and when the calculated idling leg period is shorter than a lower limit of a time period for the biped walking robot to reproduce one step corresponding to the one step by the operator, the idling leg period calculation step may invalidate the one step by the operator. It is thereby possible to appropriately control the biped walking robot even when one step of the operator is very short.

Further, the above-described biped walking robot control method may further include a hip posture calculation step of calculating a hip posture around a vertical axis of the biped walking robot as a posture obtained by combining postures of a right leg and a left leg of the biped walking robot in accordance with a ratio of weights from the detected right leg weight and left leg weight, and the control step may further controls the biped walking robot to achieve the calculated hip posture. The operator can thereby intuitively control the upper body of the biped walking robot.

A biped walking robot control system according to a second aspect of the present invention is a biped walking robot control system that serves as a master and performs master-slave control of walking of a biped walking robot that serves as a slave, including a weight detection unit that detects weights applied to a ground respectively by a right leg and a left leg of an operator, a target ZMP calculation unit that calculates a target ZMP when the biped walking robot produces weights having a ratio of the detected right leg weight and left leg weight, and a control unit that controls the biped walking robot in accordance with the calculated target ZMP. According to this aspect, the operator can intuitively control the weights of the right leg and the left leg of the biped walking robot, and the system can be implemented by a simple structure, just like the above-described biped walking robot control method.

According to the above-described aspects of the present invention, it is possible to provide a biped walking robot control method and a biped walking robot control system that enable intuitive operation of a robot with a simple structure.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

A preferred embodiment of the present invention will be described hereinafter with reference to the drawings. It should noted that specific numerical values and the like in the following embodiment are given merely for illustrative purposes, and values are not limited thereto unless particularly noted. Further, in the following description and drawings, things that are obvious to those skilled in the art and the like are appropriately omitted, shortened and simplified to clarify the explanation.

<1. System Structure>

Figure 1:
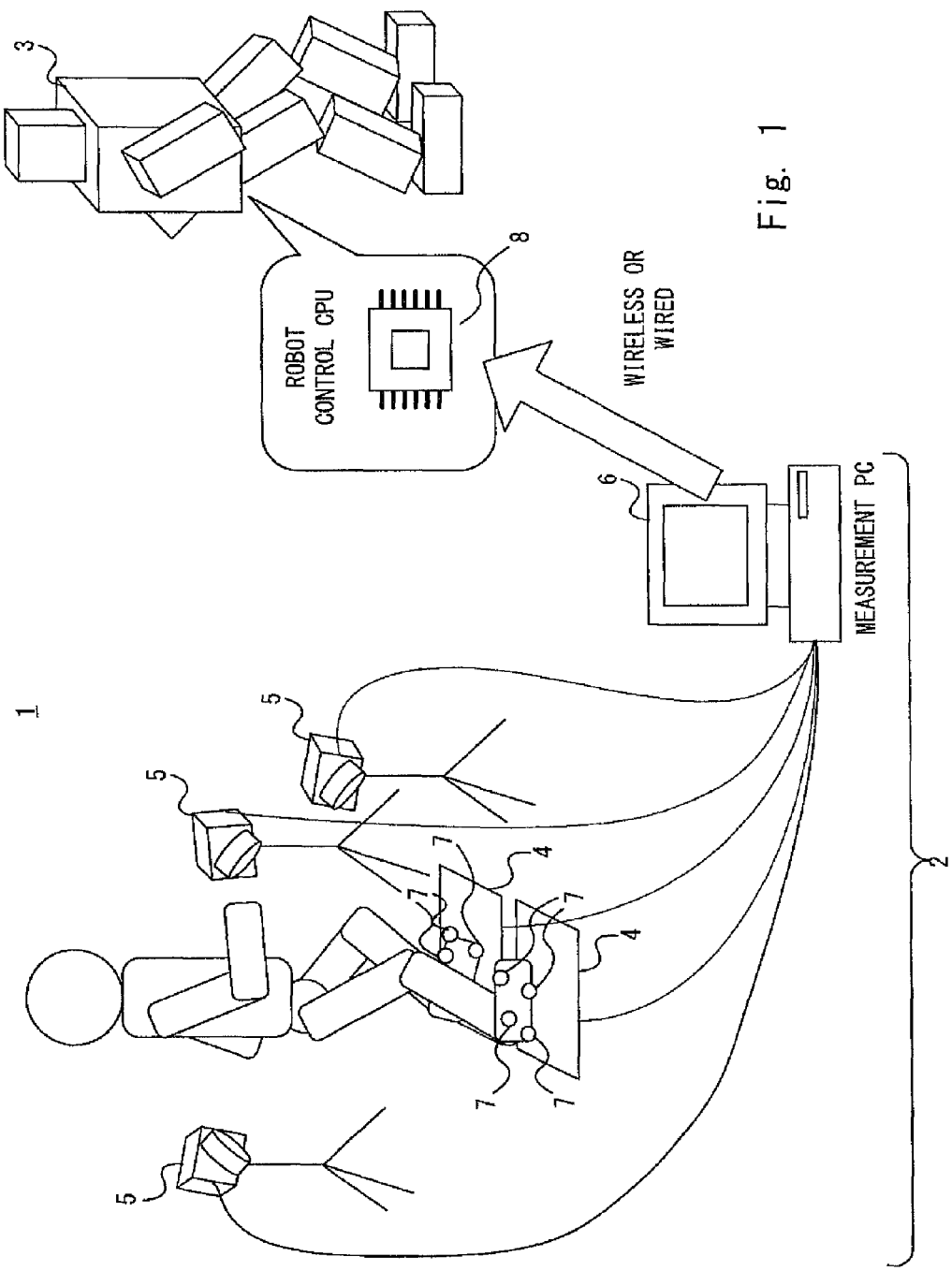
FIG. 1 is a schematic view of a master-slave control system according to this embodiment.

The structure of a master-slave control system 1 according to this embodiment is described hereinafter with reference to FIG. 1. FIG. 1 is a schematic view of the master-slave control system 1 according to this embodiment.

The master-slave control system 1 includes a biped walking robot 3 (which is also referred to simply as "robot" hereinbelow), a pair of force plates 4, a plurality of motion capture devices 5, and a measurement PC (Personal Computer) 6. The master-slave control system 1 functions as a biped walking robot control system.

The unit including the force plates 4, the motion capture devices 5 and the measurement PC 6 corresponds to a master device 2 in master-slave control. The robot 3 corresponds to a slave device in master-slave control.

The pair of force plates 4 are used by an operator standing on them with the left foot placed on one force plate 4 and the right foot placed on the other force plate 4. Each of the pair of force plates 4 thereby detects a weight that is applied to the ground by the sole of each of the right foot and the left foot of the operator. Upon detecting the weight from the sole of the operator on the ground, each of the pair of force plates 4 generates weight information indicating the amount of weights and transmits it to the measurement PC 6. The measurement PC 6 transmits the weight information received from the force plates 4 to the robot 3. The robot 3 can thereby recognize the amount of weights applied to the ground respectively by the right foot and the left foot of the operator from the amount of weights indicated by the weight information transmitted from each of the force plates 4.

Each of the plurality of motion capture devices 5 takes an image of an operator who has a plurality of markers attached to his/her foot, generates image information indicating the image and transmits it to the measurement PC 6. The measurement PC 6 calculates the height of a raised idling leg and the position and posture of the feet of the both legs from the motion of the markers included in the image indicated by the image information received from each of the plurality of motion capture devices 5. The measurement PC 6 transmits the calculated height of the raised idling leg and foot position/posture information indicating the position and posture of the feet of the both legs to the robot 3. The robot 3 can thereby recognize the height of the raised idling leg of the operator and the relative positions/postures of the right foot and the left foot of the operator.

In this manner, the measurement PC 6 transmits the weight information and the foot position/posture information as operation information to the robot 3. The robot 3 performs lower limb master-slave control using the operation information (1) to (3) obtained in this manner.
(1) The amount of weights of the right leg and the left leg
(2) The height of the raised idling leg
(3) The relative position/posture of the right leg and the left leg Note that the operation information (1) to (3) are acquired by the measurement PC 6 as needed as a result that the force plates 4 detect the weights as needed and transmit the weight signal and the motion capture devices 5 take images as needed and transmit the image information, and transmitted to the robot 3. The time resolution to acquire the operation information as needed may be about 25 msec at the shortest, for example, and the robot 3 interpolates the information to use them practically.

A CPU 8 (Central Processing Unit) (which is also referred to hereinafter as "robot CPU" in this description) that is built in the robot 3 calculates a target ZMP, a target leg position/posture of the left leg, a target leg position/posture of the right leg and a target hip posture of the robot 3 so that the motion of the robot 3 traces the motion of the operator based on the amount of weights of the right leg and the left leg, the height of the raised idling leg and the relative position/posture of the right leg and the left leg indicated by the operation information transmitted from the measurement PC 6.

The robot CPU 8 calculates each joint angle of the robot 3 based on the calculated information (the target ZMP, the target leg position/posture of the left leg, the target leg position/posture of the right leg, and the target hip position/posture) and controls each joint to have the calculated joint angle. To be specific, the robot 3 includes a plurality of actuators (not shown) that function as joints. The robot CPU 8 calculates the target angle of each actuator as each joint angle and controls each actuator so that the angle of each actuator becomes the calculated target angle. Specifically, the target angle for achieving the target ZMP, the target leg position/posture of the left leg, the target leg position/posture of the right leg, and the target hip posture is calculated. The master-slave control is thereby performed so that the motion of the robot 3 traces the motion of the operator. Note that the robot CPU 8 is built in the robot 3 and included in a microcontroller that exercises overall control over the operation of the robot 3.

Although the structure of the master-slave control system 1 is described above, a means of acquiring the height of the raised idling leg and the position/posture of the foot (the position/posture of the right foot and the position/posture of the left foot) of the operator is not limited to the above-described example. Although the case of using optical motion captures as a motion capture system is described in the above example, another motion capture system such as a mechanical or magnetic system may be used. Further, the motion sensor capable of acquiring depth information, such as KINECT (registered trademark), may be used.

A means of acquiring the amount of weights respectively from the right leg and the left leg of the operator is not also limited to the above-described example. For example, an operator may wear shoes with force sensors, and a force applied to the force sensor by each of the right leg and the left leg of the operator may be detected as a weight on the ground. Then, each force sensor of the right leg and the left leg may generate weight information indicating the detected force and transmit it to the measurement PC 6.

Further, communication between the measurement PC 6 and the robot 3 may be performed via wired or wireless. Specifically, each of the measurement PC 6 and the robot 3 includes a communication module in accordance with the selected one of wired or wireless and performs communication through the communication module. A method of implementing the communication is common and thus not described.

<2. Prerequisite for Stabilization Process in Robot>

It is assumed that the biped walking robot 3 according to this embodiment can perform real time operation that calculates a stable center of gravity trajectory based on a target ZMP and calculates each joint angle for implementing the calculated center of gravity trajectory, the target leg position/posture and the target hip posture. Further, it is assumed that the biped walking robot 3 has a processing system capable of sequential calculation of such a stabilization process for a short period (several tens msec).

As a technique for implementing the stabilization process, a center of gravity trajectory may be calculated using common preview control, model predictive control or the like. As a technique for implementing the stabilization process, preview control as disclosed in Japanese Patent No. 3834629 may be used, or model predictive control as disclosed in Japanese Unexamined Patent Application Publication No. 2013-184248 may be used. Then, the robot CPU 8 may calculate each joint angle by a common technique of calculating each joint angle by inverse kinematics using COG Jacobian from the center of gravity trajectory calculated using preview control or model predictive control.

Figure 2:
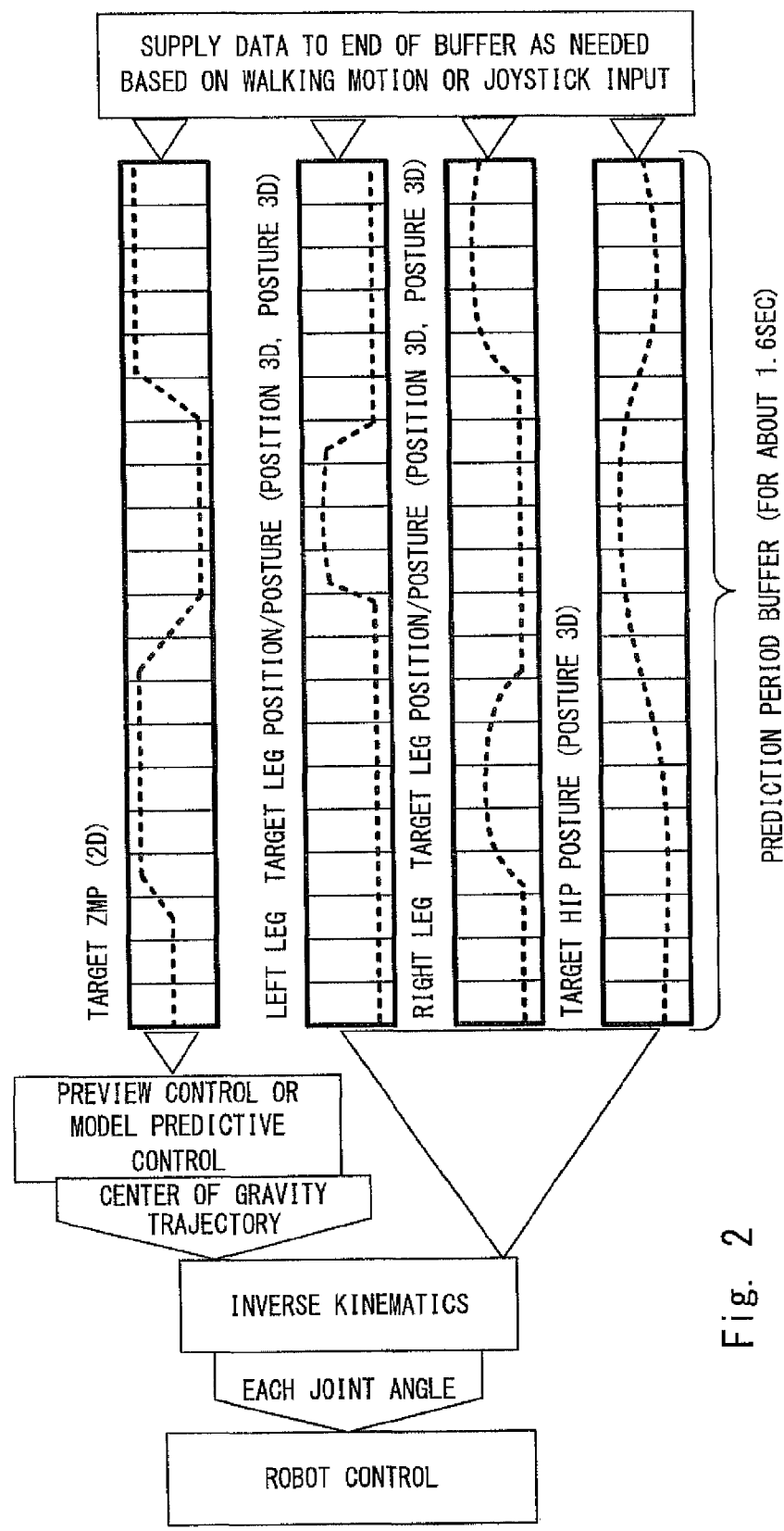
FIG. 2 is a view showing the concept of a stabilization process according to this embodiment.

In this embodiment, in order to implement the stabilization process using this technique, it is necessary to maintain future target values (the target ZMP, the target leg position/posture of the left leg, the target leg position/posture of the right leg, and the target hip posture) for a certain period of time (which is also called a preview period or a prediction period) to achieve the long-term stability of the robot 3. FIG. 2 shows the concept of the stabilization process by this technique. As shown in FIG. 2, future target values are stored into a buffer (which is also referred to hereinafter as "prediction period buffer" in this description) in the robot 3. The prediction period buffer is prepared for each of the target ZMP, the target leg position/posture of the left leg, the target leg position/posture of the right leg, and the target hip posture. Note that, the example in which the prediction period buffer has a size capable of storing future targets values for 1.6 sec is shown in FIG. 2.

In common preview control or model predictive control, based on input of an operator's walking motion, joystick or the like, a target value calculated from the input is supplied to the end of the prediction period buffer as needed. The robot acquires those target values sequentially from the head of the prediction period buffer and calculates each joint angle based on the acquired target values. To be specific, the robot calculates the center of gravity trajectory of the robot from the target ZMP by preview control or model predictive control, and calculates each joint angle by inverse kinematics from the calculated center of gravity trajectory and the target leg position/posture of the left leg, the target leg position/posture of the right leg and the target hip posture. Then, the robot controls each joint to become each of the calculated joint angles. Thus, the prediction period buffer functions as a queue.

Note that the way of storing the future target values is not limited to storage into the buffer as described above, and the future target values may be stored in a polynomial space. Further, this embodiment is intended for a robot control system having the stabilization process that stores the future target values and sequentially generates the center of gravity trajectory that ensures the stability during the period of storing the target values in a relatively short period. A method of implementing the stabilization process is not limited to the one described in this embodiment as long as the same process can be achieved.

In this embodiment, the prediction period buffer may be used so as to store a target value newly calculated based on the operation information into the backend of the prediction period buffer. However, it has been proven that the calculated center of gravity trajectory does not significantly change even when the newly calculated target value is stored into the position that advances by one second from the head of the prediction period buffer. This is because, since the target ZMP of the robot 3 is calculated from the weight of foot of the operator in this embodiment, it is possible to eliminate the ZMP transition period of the robot 3 compared with the case without such processing, as described later, and achieve the motion of the robot 3 that reflects the motion of the operator with a small delay.

<3. Process Flow>

Figure 3:
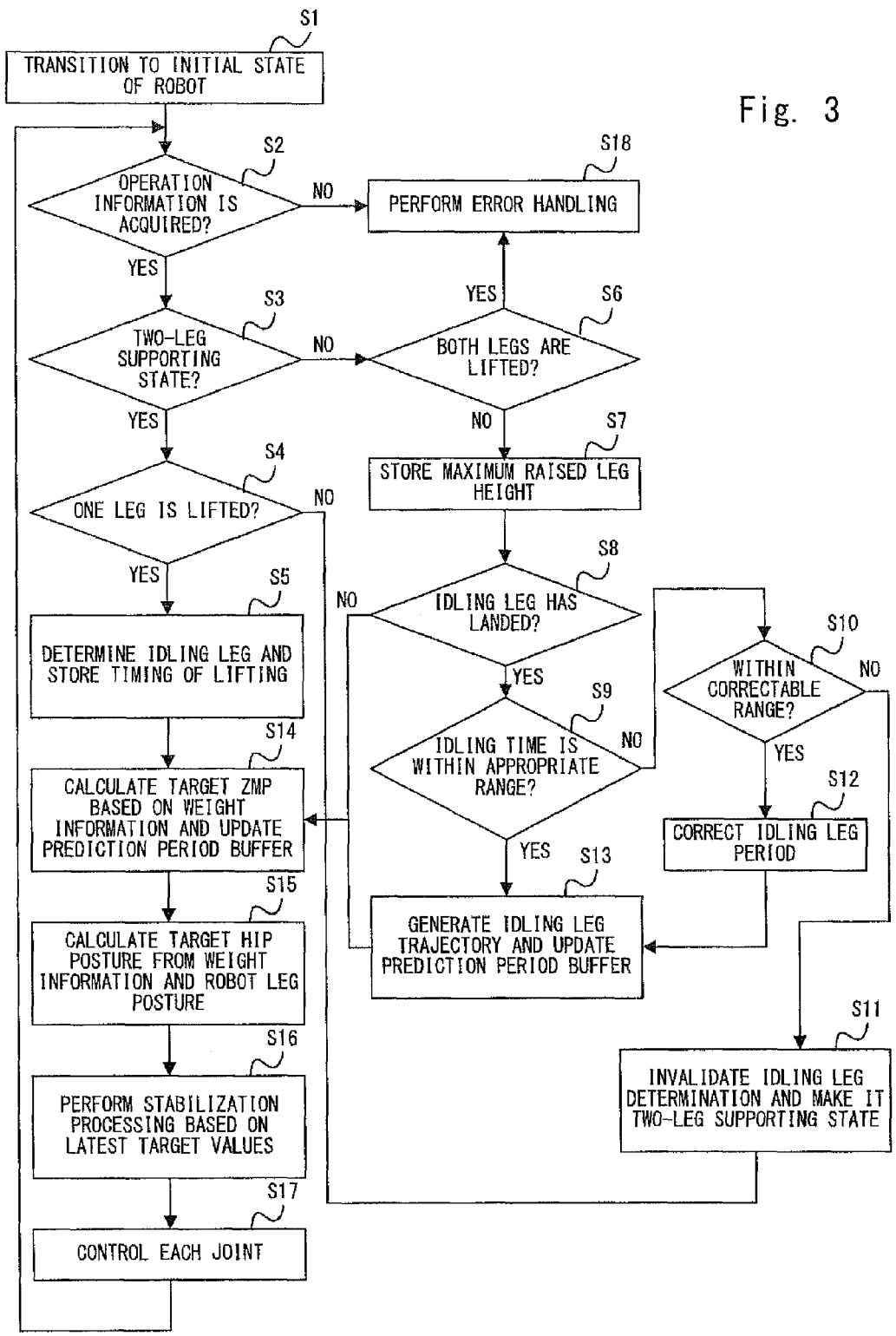
FIG. 3 is a flowchart showing a process of the master-slave control system according to this embodiment.

A process of the master-slave control system 1 according to this embodiment is described hereinafter with reference to FIG. 3. FIG. 3 is a flowchart showing a process of the master-slave control system 1 according to this embodiment.

(S1: Transition to Initial State of Robot)

The robot 3 transitions to the initial state at the start of its operation (S1). To be specific, the robot CPU 8 performs zero-return, servo-on, and transition to the initial posture of the robot 3 and thereby starts inverted control and copying control.

The robot 3 has the prediction period buffer as shown in FIG. 2. In the prediction period buffer, an update position is set in advance. As shown in the pattern A of FIG. 4, if the update position is set at the backend of the prediction period buffer, the robot 3 carries out the motion that reflects the motion of the operator with a delay corresponding to a prediction period (the time to acquire the target value of the prediction period buffer from the head to the backend: 1.6 seconds). If the update position is set at the middle of the prediction period buffer, the robot 3 carries out the motion that reflects the motion of the operator with a delay corresponding to half the prediction period (0.8 seconds). Further, as shown in the pattern B of FIG. 4, if the update position is set at the position too close to the head of the prediction period buffer, although a delay until the motion of the operator is reflected on the robot 3 becomes shorter, when the operator takes a long step, the target value corresponding to it cannot be stored. Accordingly, as shown in the pattern C of FIG. 4, it is preferred to set the update position during the period of about one second from the head of the prediction period buffer as described above in consideration of the stability of the motion of the robot 3 and the delay reduction.

The robot CPU 8 stores the target ZMP, the target leg position/posture of the left leg, the target leg position/posture of the right leg, and the target hip posture that are calculated based on the operation information received from the measurement PC 6 into the prediction period buffer in accordance with the update position that is set in advance in the above manner. It is assumed that the robot CPU 8 fills the prediction period buffer to its end with the same target value as the target value at the update position as shown in the pattern C of FIG. 4.

The size of the prediction period buffer may be set to the size up to the update position. However, if an extra time is allowed for in the calculation time of the robot CPU 8, the size of the prediction period buffer is preferably the size to store the future target value after the update position as well as described above. Further, it is also effective to calculate and store the target value that ensures higher dynamic stability in the prediction period buffer from the update position to the end, as described later in "6. Modified Example of Embodiment", for example.

(S2: Determination on Acquisition of Operation State)

The robot CPU 8 determines whether the operation information is acquired without disruption (S2). To be specific, the robot CPU 8 determines whether the operation information is received from the measurement PC 6 at certain intervals without disruption. When the operation information of the operator is not acquired (S2: No), the robot CPU 8 performs error handling in S18, which is described later.

(S3: Determination on Whether Operation State is Two-leg Supporting State)

The operation state of the operator is broadly divided into three states: two-leg support, one-leg support (one leg lifted), and no support (both legs lifted). The robot CPU 8 determines which of those states the operation state of the operator is by the following process based on the acquired operation state.

Because the operation in the two-leg lifting state (for example, the state of jumping) is not handled in this embodiment, it is determined as an error in S6, which is described later. Thus, the robot CPU 8 determines whether it is the two-leg supporting state, and the process branches out. Specifically, when the operation information of the operator is acquired (S2: Yes), the robot CPU 8 determines whether it is the two-leg supporting state (S3). Note that it is preferred that the process begins with the two-leg supporting state at the start of the process in this embodiment.

Figure 5:
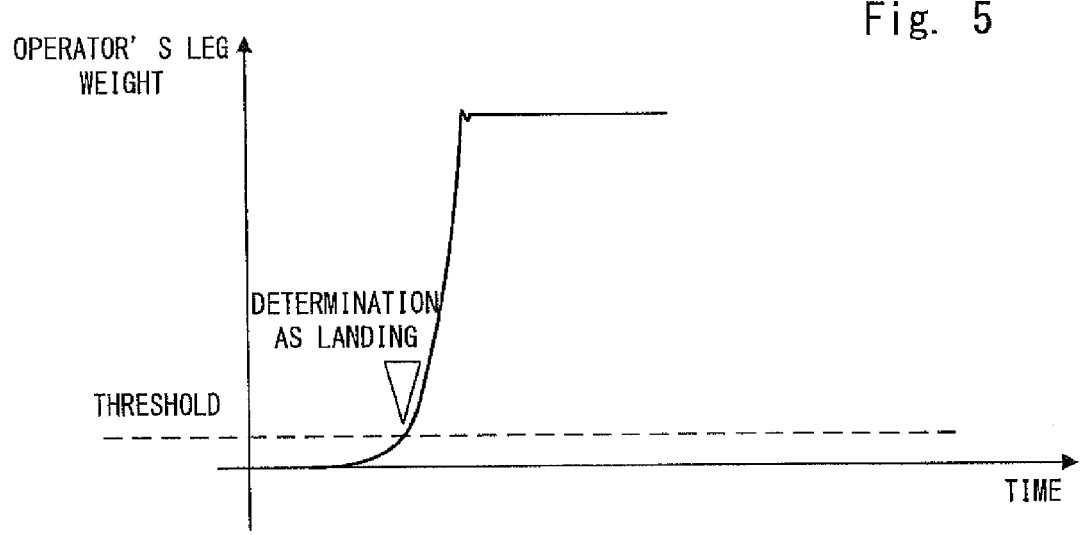
FIG. 5 is a view showing determination as landing according to this embodiment.

Whether it is the two-leg supporting state or not is determined based on whether both of the weight of the right leg and the weight of the left leg exceed a specified weight threshold as shown in FIG. 5 based on the weights of the right leg and the left leg indicated by the weight information received from the measurement PC 6. When both of the weight of the right leg and the weight of the left leg are more than the weight threshold, the robot CPU 8 determines that it is the two-leg supporting state. On the other hand, when both of the weight of the right leg and the weight of the left leg are not more than a specified weight threshold, the robot CPU 8 determines that it is not the two-leg supporting state.

(S4: Determination on Lifting)

When it is determined to be the two-leg supporting state (S3: Yes), the robot CPU 8 determines whether either one leg is lifted and the state has transitioned from the two-leg supporting state to the one-leg supporting state (S4).

Figure 6:
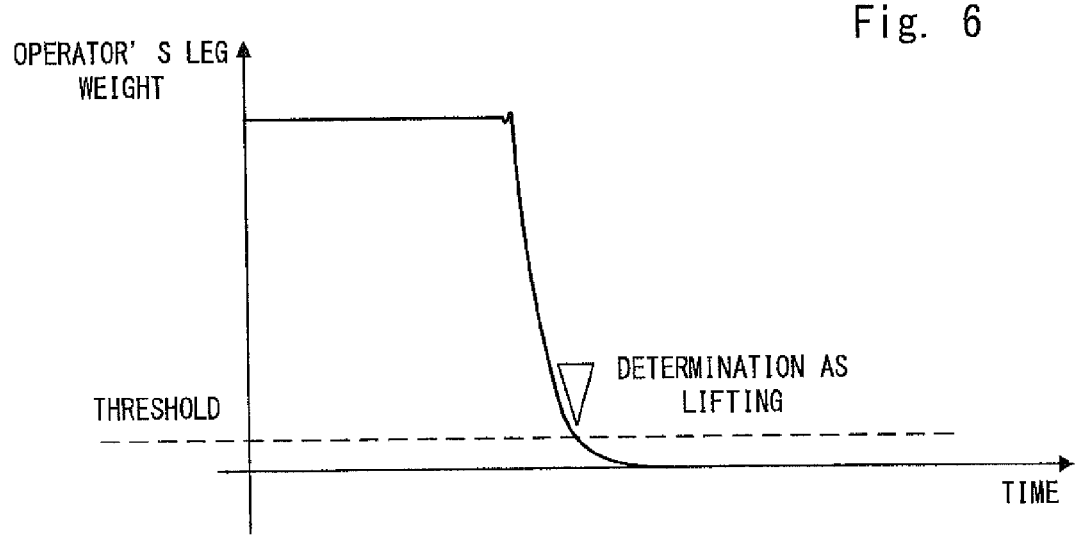
FIG. 6 is a view showing determination as lifting according to this embodiment.

Whether it is the one-leg supporting state or not is determined depending on whether one of the weight of the right leg and the weight of the left leg of the operator falls below the above-described weight threshold as shown in FIG. 6 based on the weight information received from the measurement PC 6. When one of the weight of the right leg and the weight of the left leg of the operator is less than the weight threshold and the other one is more than the weight threshold, the robot CPU 8 determines that it has changed to the one-leg supporting state. On the other hand, when both of the weight of the right leg and the weight of the left leg of the operator are still more than the weight threshold, the robot CPU 8 determines that it is not the one-leg supporting state. When it is determined that one leg of the operator is not lifted (No: S4), the robot CPU 8 performs the target ZMP calculation in S14, which is described later. In this case, calculation of the target ZMP is conducted in the two-leg supporting state.

Note that, in order to prevent chattering, it may be determined to be the lifting state when the state where one of the weight of the right leg and the weight of the left leg of the operator is less than the weight threshold continues for a certain period of time or more. Further, the determination accuracy may be improved by considering the measured leg height of the operator. To be specific, when the weight of one leg of the operator is less than the weight threshold and the height of the raised one leg (idling leg) is more than a specified raised leg height threshold, the robot CPU 8 may determine that it is the one-leg supporting state. Further, the robot CPU 8 may determine whether it is the one-leg supporting state based only on the height of the raised one leg (idling leg).

(S5: Maintaining Lifting State)

When it is determined that one leg of the operator is lifted and it is the one-leg supporting state (S4: Yes), the robot CPU 8 stores the timing when the lifting is determined in S4 and information indicating which of the right leg and the left leg is lifted into a storage device (for example, a hard disk, a memory etc.) included in the robot 3 as information for calculating the idling leg position/posture when the idling leg is landing in the process described later (S5). Then, the robot CPU 8 performs target ZMP calculation in S14, which is described later. In this case, calculation of the target ZMP is conducted in the one-leg supporting state.

(S6: Determination on Two-Leg Lifting)

On the other hand, when it is determined not to be the two-leg supporting state (S3: No), the robot CPU 8 determines whether it has transitioned to the two-leg lifting state where both of the right leg and the left leg are lifted (S6).

Whether it is the two-leg lifting state or not is determined depending on whether both of the weight of the right leg and the weight of the left leg fall below the above-described threshold based on the weight information received from the measurement PC 6. When both of the weight of the right leg and the weight of the left leg are less than the threshold, the robot CPU 8 determines that it is the two-leg lifting state. On the other hand, when both of the weight of the right leg and the weight of the left leg are not less than the threshold, the robot CPU 8 determines that it is not the two-leg lifting state.

When it is determined to be the two-leg lifting state (S6: Yes), the robot CPU 8 performs error handling in S18, which is described later, because the case where both legs are lifted from the ground is not assumed in this embodiment.

(S7: Acquisition of Candidate Raised Leg Height)

Figure 7:
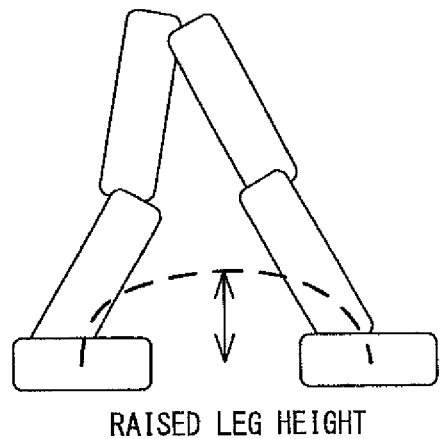
FIG. 7 is a view showing the trajectory of walking of an operator.

When it is during the one-leg supporting state (when it is determined not to be the two-leg lifting state (S6: No), this processing is performed at all times. In this step, the robot CPU 8 determines whether the height of the raised idling leg of the operator reaches its maximum height after lifted based on the operation information received from the measurement PC 6. When it is the maximum height, the robot CPU 8 stores the height into the storage device as a candidate for the maximum height of the raised leg height of the idling leg trajectory of the robot 3 (S7). Specifically, based on the operation information received from the measurement PC 6, the robot CPU 8 compares the height of the raised idling leg indicated by the newly received operation information with the candidate height stored in the storage device as needed. Then, when the newly derived height of the raised idling leg is higher than the candidate height stored in the storage device, the robot CPU 8 updates the candidate height to the newly derived height of the raised idling leg. On the other hand, when the candidate height stored in the storage device is higher than the newly derived height of the raised idling leg, the robot CPU 8 maintains the currently stored candidate height. It is thereby possible to detect and store the height at the point of time when the leg is raised to the highest in the idling leg trajectory of the operator as shown in FIG. 7. The maximum value of the raised leg height that finally remains as the candidate height is used as the maximum value of the raised leg height of the robot 3 in idling leg trajectory generation of the robot 3 in S13, which is described later.

In practice, in consideration of the raised leg height available by the robot 3, it is preferred to set the upper limit and the lower limit of the raised leg height in advance, and when the raised leg height is outside the range from the upper limit to the lower limit, round the candidate raised leg height to be within that range.

Further, the height of the raised idling leg trajectory of the robot 3 may be a predetermined fixed value and not limited to the above-described method. However, preferably, walking that reflects the intention of the operator is made possible by reflecting the maximum value of the detected height of the raised idling leg of the operator as the maximum value of the height of the raised idling leg of the robot 3 as described above.

(S8: Determination on Idling Leg Landing)

This determination is made each time in the one-leg supporting state. The robot CPU 8 determines whether the idling leg has landed or not (S8).

Whether the idling leg has landed is determined depending on whether the weight from the leg that is recognized as the idling leg of the operator has exceeded the above-described threshold as shown in FIG. 5 based on the weight indicated by the operation information received from the measurement PC 6. When the weight of the leg that is recognized as the idling leg of the operator is more than the threshold, the robot CPU 8 determines that the idling leg has landed. On the other hand, when the weight of the leg that is recognized as the idling leg of the operator is not more than the threshold, the robot CPU 8 determines that the idling leg has not landed. When it is determined that the idling leg has not landed (S8: No), the robot CPU 8 performs target ZMP calculation in S14, which is described later. In this case, calculation of the target ZMP is conducted in the one-leg supporting state.

(S9: Determination on Appropriateness of Idling Leg Period)

Figure 8:
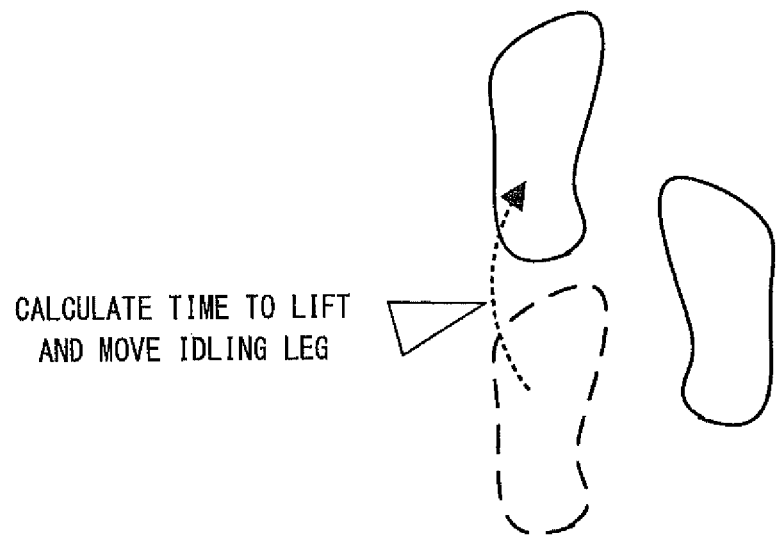
FIG. 8 is a view showing an image of an idling leg period from lifting to landing of one leg of an operator.

When it is determined that the idling leg has landed (S8: Yes), this processing is started. The robot CPU 8 calculates the time period of an idling leg (idling leg period) as a difference between the stored timing of lifting and the timing of landing. As shown in FIG. 8, the period of time from when the operator lifts one leg to when he/she lands that leg is calculated. The robot CPU 8 determines whether the calculated idling leg period is within an appropriate range or not (S9).

Figure 9:
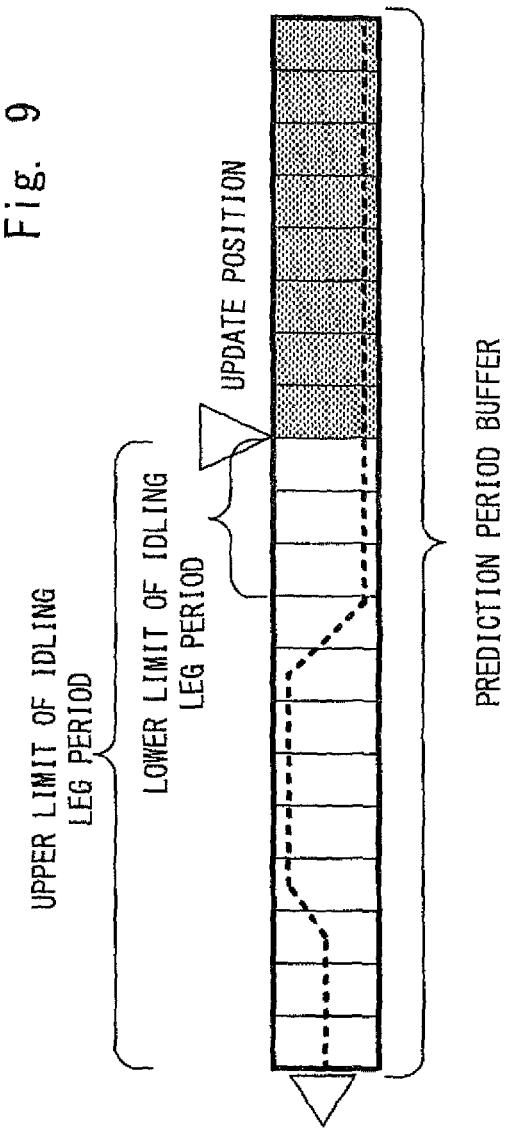
FIG. 9 is a view showing the upper limit and lower limit of an idling leg period according to this embodiment.

To be specific, the robot CPU 8 determines whether the calculated idling leg period is within a range between the predetermined lower limit and upper limit. As the lower limit, the minimum time to take one step is set in advance by taking the operating performance of leg joints of the robot 3 into consideration. In this embodiment, when the idling leg of the operator has landed, the idling leg trajectory of the robot 3 corresponding to the one step (the target leg position/posture for the one step) is calculated and stored by going back from the update position to the head of the prediction period buffer, as described later. Therefore, because the idling leg trajectory of more than the time from the update position to the head of the prediction period buffer cannot be stored, the time period from the update position to the head of the prediction period buffer is the upper limit of the idling leg period as shown in FIG. 9. Further, in the case where the idling leg period is equal to the lower limit period, information of the target leg position/posture corresponding to the one step of the idling leg is stored into the region for the lower limit period from the update position to the head in the prediction period buffer. When the idling leg period is within the range from the upper limit to the lower limit (equal to or shorter than the upper limit and equal to or longer than lower limit), the robot CPU 8 determines that the idling leg period is within an appropriate range, when the idling leg period is outside the range from the upper limit to the lower limit (longer than the upper limit and shorter than lower limit), the robot CPU 8 determines that the idling leg period is not within an appropriate range. When it is determined that the idling leg period is within an appropriate range (S9: Yes), the robot CPU 8 performs idling leg trajectory generation and update in S13, which is described later.

(S10: Determination on Whether Idling Leg Period is Correctable)

In the case where it is determined that the idling leg period is not within an appropriate range (S9: No), the robot CPU 8 determines whether the idling leg period is correctable or not (S10).

To be specific, when the idling leg period is longer than the upper limit, it can be corrected to the length within the upper limit, and therefore the robot CPU 8 determines that it is correctable. On the other hand, when the idling leg period is shorter than the lower limit, although it can be corrected to the length equal to or longer than the lower limit, if information of the idling leg trajectory corresponding to the previous one step is left at the position closer to the update position than the lower limit of the idling leg period in the prediction period buffer, a part of the information is overwritten in a half-finished way by the idling leg generation and update processing in S13, which is described later. Therefore, when the idling leg period is shorter than the lower limit, the robot CPU 8 determines that it is correctable only when such a situation does not occur.

Specifically, the robot CPU 8 determines that it is correctable when a time equal to or longer than the lower limit of the idling leg period has elapsed from when the idling leg generation and update processing of S13 has been performed last time. This is because information for at least the lower limit time of the idling leg period is sequentially acquired and used from the head after the idling leg trajectory of the idling leg trajectory is updated last time, and the information of the previous idling leg trajectory is not stored in the range of the lower limit time of the idling leg period from the update position in the prediction period buffer in this case. Thus, even if correction is made to extend the idling leg period to the lower limit of the idling leg period, the previous idling leg trajectory is not overwritten. On the other hand, when a time equal to or longer than the lower limit of the idling leg period has not elapsed, the robot CPU 8 determines that it is not correctable. When the robot CPU 8 determines that the idling leg period is correctable (S10: Yes), it proceeds to the processing of S12, and when the robot CPU 8 determines that the idling leg period is not correctable (S10: No), it proceeds to the processing of S11.

(S11: Invalidation of Idling Leg Determination)

When it is determined that the idling leg period is not correctable (S10: No), because it is too short step as described above and the correction is not possible, the robot CPU 8 cancels the current one-leg supporting state and changes it to the two-leg supporting state. Although one step of the operator is thereby ignored, because the idling leg trajectory of the robot 3 is not yet generated, there is no need to perform any processing particularly, and the robot CPU 8 only needs to change the internal state to be recognized (update of the operation state recognized as described above or the like). Then, the robot CPU 8 performs target ZMP calculation in S14, which is described later. In this case, calculation of the target ZMP is conducted in the two-leg supporting state.

(S12: Change of Idling Leg Period)

When it is determined that the idling leg period is correctable (S10: Yes), the robot CPU 8 corrects the idling leg period (S12). Specifically, the robot CPU 8 corrects the idling leg period to be within the range of the upper limit and the lower limit. To be specific, when the idling leg period is longer than the upper limit, the robot CPU 8 shortens the idling leg period to meet the upper limit. When the idling leg period is shorter than the lower limit, the robot CPU 8 lengthens the idling leg period to meet the lower limit.

(S13: Generation of Idling Leg Trajectory)

Figure 10:
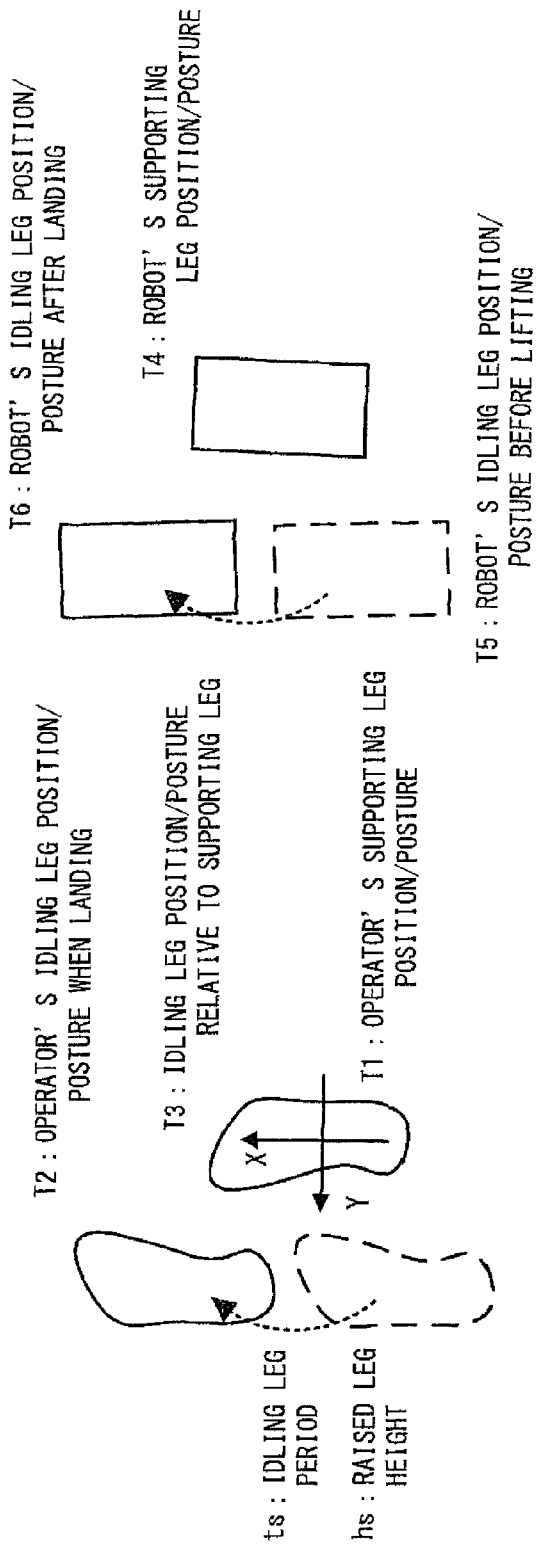
FIG. 10 is a view showing parameters used for generation of an idling leg trajectory according to this embodiment.

The robot CPU 8 generates the idling leg trajectory so that stepping of the idling leg ends at the update position of the prediction period buffer that is set in advance in the processing of S1. The parameters to be used in this processing are defined as follows and shown in FIG. 10.

ts: Idling leg period calculated in S9 to S12 (scalar)
hs: Raised leg height calculated in S7 (scalar)
T1: Operator's supporting leg position/posture (homogeneous transformation matrix)
T2: Operator's idling leg position/posture when landing (homogeneous transformation matrix)
T3: Operator's idling leg position/posture relative to supporting leg (homogeneous transformation matrix)
T4: Robot 3's supporting leg position/posture (homogeneous transformation matrix)
T5: Robot 3's idling leg position/posture before lifting (homogeneous transformation matrix)
T6: Robot 3's idling leg position/posture after landing (homogeneous transformation matrix)

The robot CPU 8 calculates the idling leg position/posture T6 of the robot 3 by the following Equation 1.

$$T_6 = T_4 T_3 = T_4(T_1^{-1} T_2) \quad \text{Equation 1}$$

As is obvious from the above Equation 1, in the case where T3 can be calculated from the first by attaching a 3D magnetic sensor to the foot of a user and directly detecting the relative positions of the right leg and the left leg, for example, there is no need to calculate T1 and T3 in the robot CPU 8. Further, T3 may be changed by multiplying a value calculated from the operation information by a certain rate in consideration of a difference between the length of step of a person and the length of step of the robot 3. Further, it may be changed to a value for preventing self-interference in consideration of the movable range and the size of the foot of the robot 3.

The robot CPU 8 generates the idling leg trajectory (the target leg position/posture of the right foot and the left foot for one step) by interpolating it to reach the idling leg position/posture T6 of the robot 3 upon landing for the idling leg period is from the idling leg position/posture T5 of the robot 3 before lifting, and updates the prediction period buffer of the robot 3 (S13). Basically, the target value of each idling leg position/posture that constitutes the idling leg trajectory can be interpolated by fifth order polynomial interpolation so that the speed and acceleration at the top and end of the idling leg trajectory are 0. In the case of taking the raised leg height into account, interpolation that vertically raises the leg by the raised leg height and then lowers it is added, and sixth order polynomial interpolation is used.

Further, as the practical idling leg trajectory that is applied to the robot 3, it has a negative influence on stability such as stumbling with the foot due to friction if the leg does not take a step forward, backward, left or right after it is lifted off the ground in the vertical direction. It is thus practical to generate the trajectory that takes a step after the idling leg is completely raised by delaying the start of an interpolated trajectory other than the idling leg trajectory in the vertical direction (z-axis direction) and ending it earlier. In this embodiment, any method may be used as a detailed implementation method.

Figure 11:
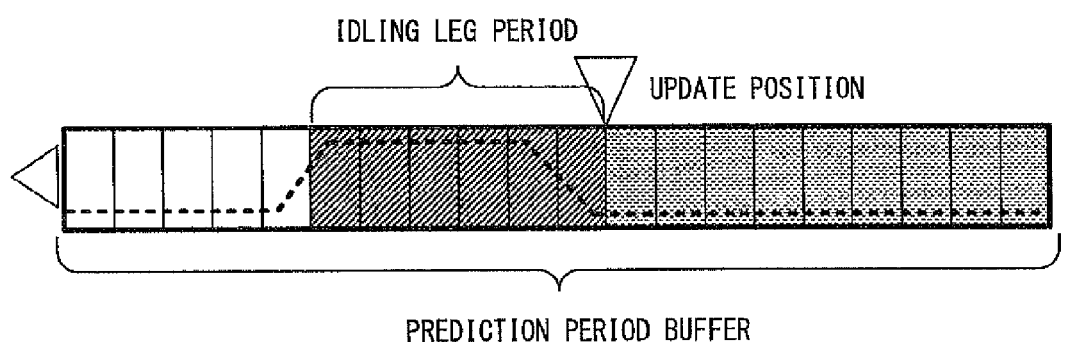
FIG. 11 is a view showing an example of update of target leg position/posture according to this embodiment.

As a result of this processing, the target leg position/posture for the idling leg is updated to the point going back from the update position by the length of the idling leg period in the prediction period buffer. Specifically, as shown in FIG. 11, the shaded area of the prediction period buffer is updated. Further, as indicated by the meshed area of FIG. 11, it is preferred to fill the prediction period buffer from the update position to its end with the same information as the information upon landing (update position).

To be specific, as shown in FIG. 11, the robot CPU 8 stores information indicating the generated idling leg trajectory in the range going back from the update position by the length of the idling leg period in the prediction period buffer. Then, the robot CPU 8 fills the range after the update position in the prediction period buffer with information of the target leg position/posture upon landing (information of the last target leg position/posture in the idling leg trajectory).

Note that, at times other than when the idling leg is determined to be landing and the idling leg trajectory is generated, the target leg position/posture of each leg can be updated at the update position by copying the previous information as it is. Further, when the target leg position/posture is acquired from the head of the prediction period buffer and a space is created at the end of the prediction period buffer, the previous information may be copied as it is and stored into that position. In other words, in this embodiment, update of the target leg position/posture for the idling leg trajectory is performed only at the time when the idling leg is determined to be landing.

(S14: Calculation of Target ZMP from Weight Operation Information)

The robot CPU 8 calculates the target ZMP of the robot 3 based on the operation information received from the measurement PC 6 by the following Equation 2 and thereby updates the prediction period buffer of the robot 3 (S14). Note that fL and fR in Equation 2 are the leg positions of the robot 3 at the point of the prediction period buffer update position.

Fzr: vertically downward weight of operator's right leg (scalar)

Because the amount of weights of the right leg and the left leg of the operator and the leg position/posture (target leg position/posture) of the right leg and the left leg of the robot 3 have been updated before starting this processing, the robot CPU 8 calculates the target ZMP at the update position based on the amount of weights of the right leg and the left leg indicated by the weight information and the positions of the right leg and the left leg in the target leg position/posture at the update position of the prediction period buffer. Then, the robot CPU 8 performs processing to fill the entire part after the update position in the prediction period buffer with information of the calculated target ZMP as shown in FIG. 12.

Figure 12:
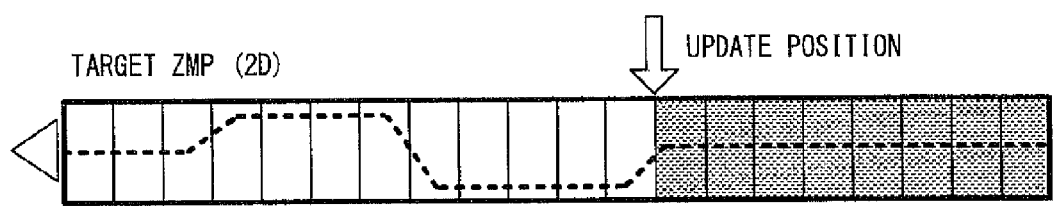
FIG. 12 is a view showing an example of update of a target ZMP according to this embodiment.

To be specific, as shown in FIG. 12, the robot CPU 8 stores information indicating the calculated target ZMP into the whole area after the update position (the area from the update position to the end) in the prediction period buffer.

In the condition where the idling leg is determined to be lifted, because the amount of weight of the lifted leg (Fzl or Fzr) is 0 or substantially 0 in Equation 2, almost no influence is exerted even when the idling leg is changed next in S13.

As a result of this processing, because the target ZMP is calculated according to the ratio of the weights of the right leg and the left leg that are applied to the ground by the operator, it is possible to intuitively control the ratio of the weights that are applied to the ground by the robot 3. Specifically, the distance from each of the right leg and the left leg of the robot 3 to ZMP is determined as the ratio that is inversely proportional to the ratio of the weights of the right leg and the left leg of the operator. In other words, the ratio of the weights of the right leg and the left leg of the robot 3 can be set as the ratio of the weights of the right leg and the left leg of the operator. Although the example of calculating the target ZMP on the basis of the foot position (for example, the center of the tip of the foot) of the robot 3 is described, ZMP may be calculated from the foot position of the operator and the weight from the foot, and a position corresponding to the calculated ZMP in the robot 3 may be calculated as the target ZMP.

(S15: Calculation of Target Hip Posture from Weight Information and Robot Leg Posture)

Next, the robot CPU 8 calculates the target hip posture based on the amount of weights of the right leg and the left leg indicated by the weight information and the leg postures of the right leg and the left leg in the target leg position/posture at the update position of the prediction period buffer, and stores the calculated target hip posture into the update position of the prediction period buffer (S15). In this step, the hip posture in the direction of rotation around the axis along the vertical direction (z-axis direction) is calculated. To be specific, the hip posture around the z-axis is calculated by the following Equation 3 so that the upper limb points in the direction of the foot to which a larger weight is applied by the operator.

$$\text{desired } ZMP = \frac{fL \cdot Fzl + fR \cdot Fzr}{Fzl + Fzr} \quad \text{Equation 2}$$

$$\theta_w = \frac{\theta_l \cdot Fzl + \theta_r \cdot Fzr}{Fzl + Fzr} \quad \text{Equation 3}$$

desired ZMP=target ZMP (2D vector of (x,y))
fL: center position of robot's left leg (2D vector of (x,y))
fR: center position of robot's right leg (2D vector of (x,y))
Fzl: vertically downward weight of operator's left leg (scalar)

$\theta_w$: hip posture around z-axis (scalar)
$\theta_l$: left leg posture around z-axis (scalar)
$\theta_r$: right leg posture around z-axis (scalar)
Fzl: vertically downward weight of operator's left leg (scalar)

Fzr: vertically downward weight of operator's right leg (scalar)

Although this is applicable to another hip posture, it is preferably applied to the hip posture around the z-axis as described above for natural motion. Further, just like the case of the target ZMP shown in FIG. 12, the processing to fill the entire part after the update position in the prediction period buffer with information of the calculated target hip posture is performed.

To be specific, the robot CPU 8 stores information indicating the calculated target hip posture into the entire range after the update position in the prediction period buffer just like the case shown in FIG. 12.

In this manner, in this processing, the hip posture is set to a posture that is obtained by combining the postures of the left leg and the right leg of the robot 3 on which the postures of the left leg and the right leg of the operator are reflected by using the ratio of the weights of the left leg and the right leg of the operator. According to this processing, the operator can intuitively control the direction of the upper limb of the robot 3 by the weight operation on both legs. This is innovative because it is possible to control the upper limb from few measurement information without measuring the hip posture of the operator. Further, the hip posture may be set to the middle posture between the both leg postures, and it is not limited to the above method.

(S16: Execution of Stabilization Process)

The robot CPU 8 performs preview control or model predictive control and generates the center of gravity trajectory that is stable all over the prediction period. Specifically, the robot CPU 8 calculates the current and future target center of gravity positions based on all of the target ZMPs stored in the prediction period buffer of the target ZMP. Preview control may be performs over a plurality of steps in consideration of the moment around the center of gravity. Then, the robot CPU 8 performs inverse kinematics to satisfy the calculated center of gravity trajectory and the target leg position/posture and calculates the final joint angles (S16). Specifically, the robot CPU 8 calculates each joint angle which the robot 3 should have at the present moment based on the calculated center of gravity trajectory, the target leg position/posture of the right leg and the target leg position/posture of the left leg at the head of the prediction period buffer, and the target hip posture.

While low-level control which is control of the independent axis actuator of the robot is generally at a high-frequency period, high-level control such as preview control is at a rather slow period with a calculation time of several tens msec. In practice, the center of gravity positions for several samples which are calculated as the center of gravity trajectory in preview control are processed on the low-level control side. Because the control in S16 can be made according to related art, detailed description thereof is omitted.

(S17: Control of Each Joint)

The robot CPU 8 controls the actuator corresponding to each joint, using each of the calculated joint angles as the target angle (S17). Note that, because information of the prediction period buffer is consumed for one control period at this time, information at the head is eliminated, and new information is added to the end. As described above, the same information as the information that has been at the end of the prediction period buffer may be tentatively added as described above.

(S18: Error Handling)

In this embodiment, when the both legs of the operator are lifted (S6: Yes) or the acquisition of the operation information is disrupted (S2: No), the robot 3 is safely brought to a halt as an error (S18). In this case, the robot CPU 8 may set the trajectory of the target ZMP back to the current center of both legs of the robot 3, and idling leg determination and idling leg trajectory generation are not performed after that. Specifically, the robot CPU 8 may sequentially generate the target ZMPs to gradually return to the center of both legs of the robot 3 and update the prediction period buffer. Further, the prediction period buffer may return to the normal processing (may resume the processing shown in FIG. 3) when reception of the operation information is recovered to normal and when it is determined that both legs of the operator have landed again.

<4. Stabilization>

Figure 4:
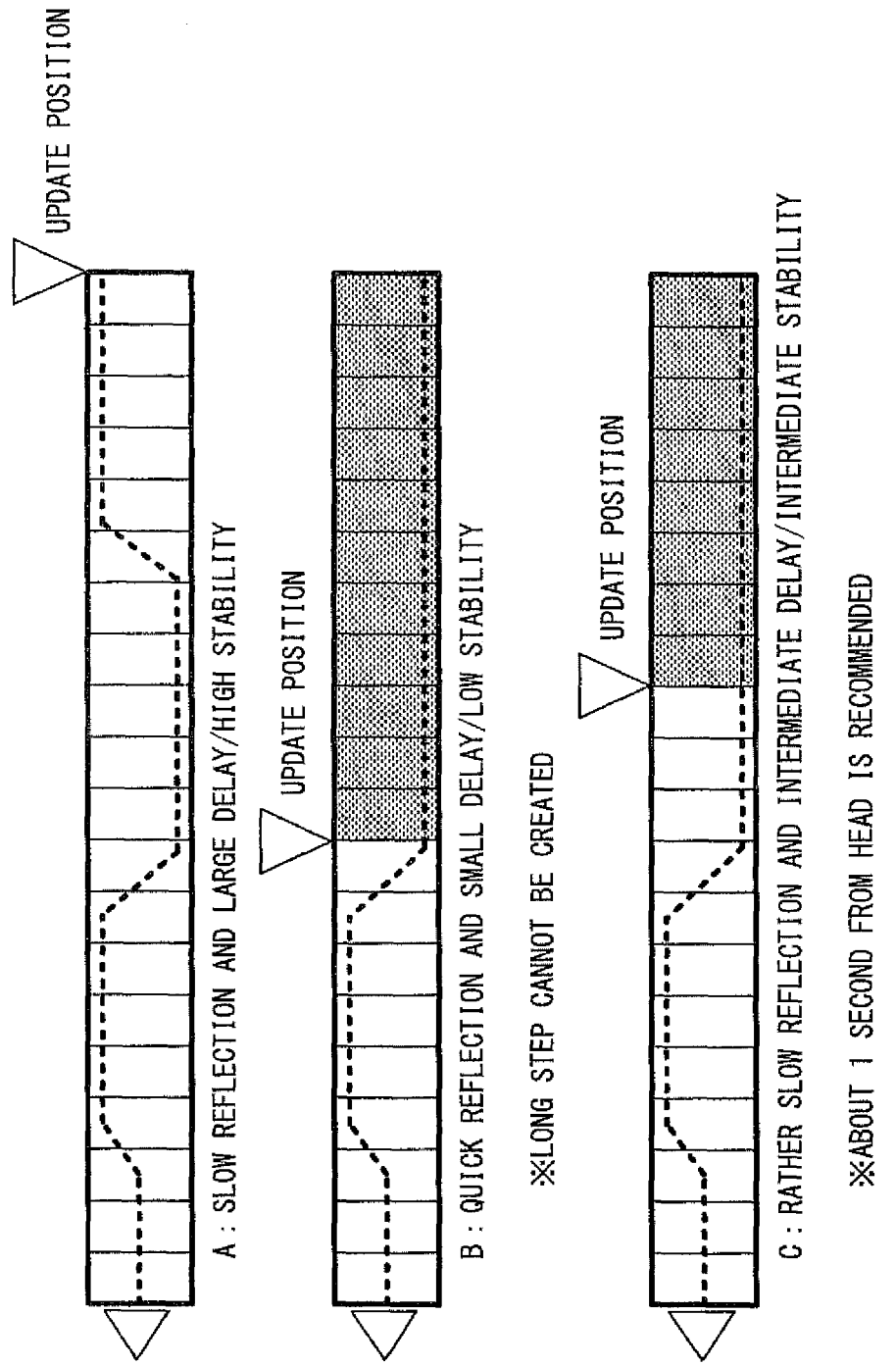
FIG. 4 is a view showing the relationship of a buffer update position with an operation delay and stability.

In this embodiment, the update position of the target value in the prediction period buffer is set at the middle position, not the backend, and provisional values are stored after that as shown in the pattern C of FIG. 4. Further, in the generation of the idling leg trajectory, the range going back to the head from the update position of the prediction period buffer is updated as shown in FIG. 11. Therefore, there is a concern that the center of gravity trajectory for ensuring stability changes abruptly when applying preview control or model predictive control for processing stabilization of the robot 3.

Figure 13:
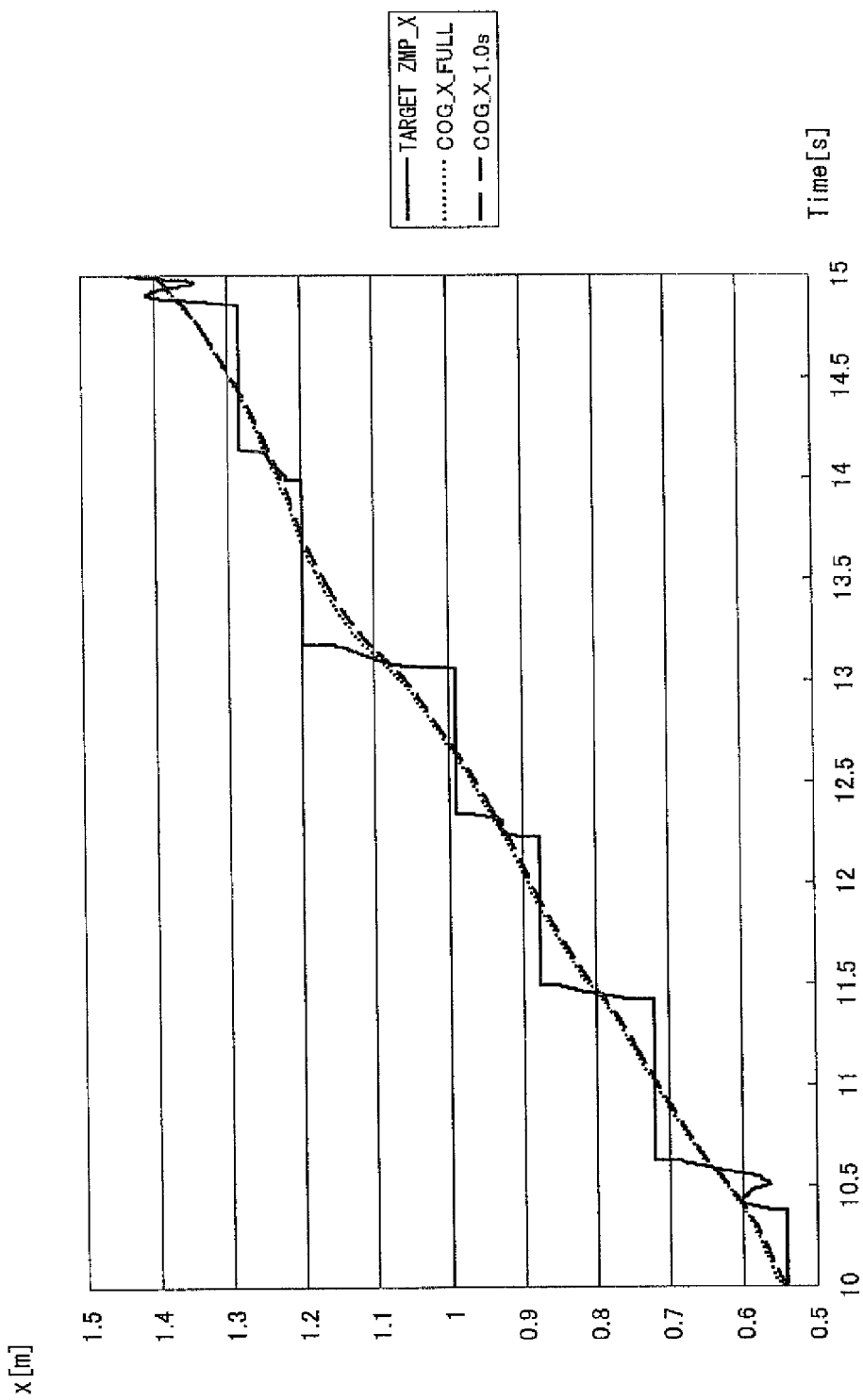
FIG. 13 is a view showing an experimental result according to this embodiment.
Figure 14:
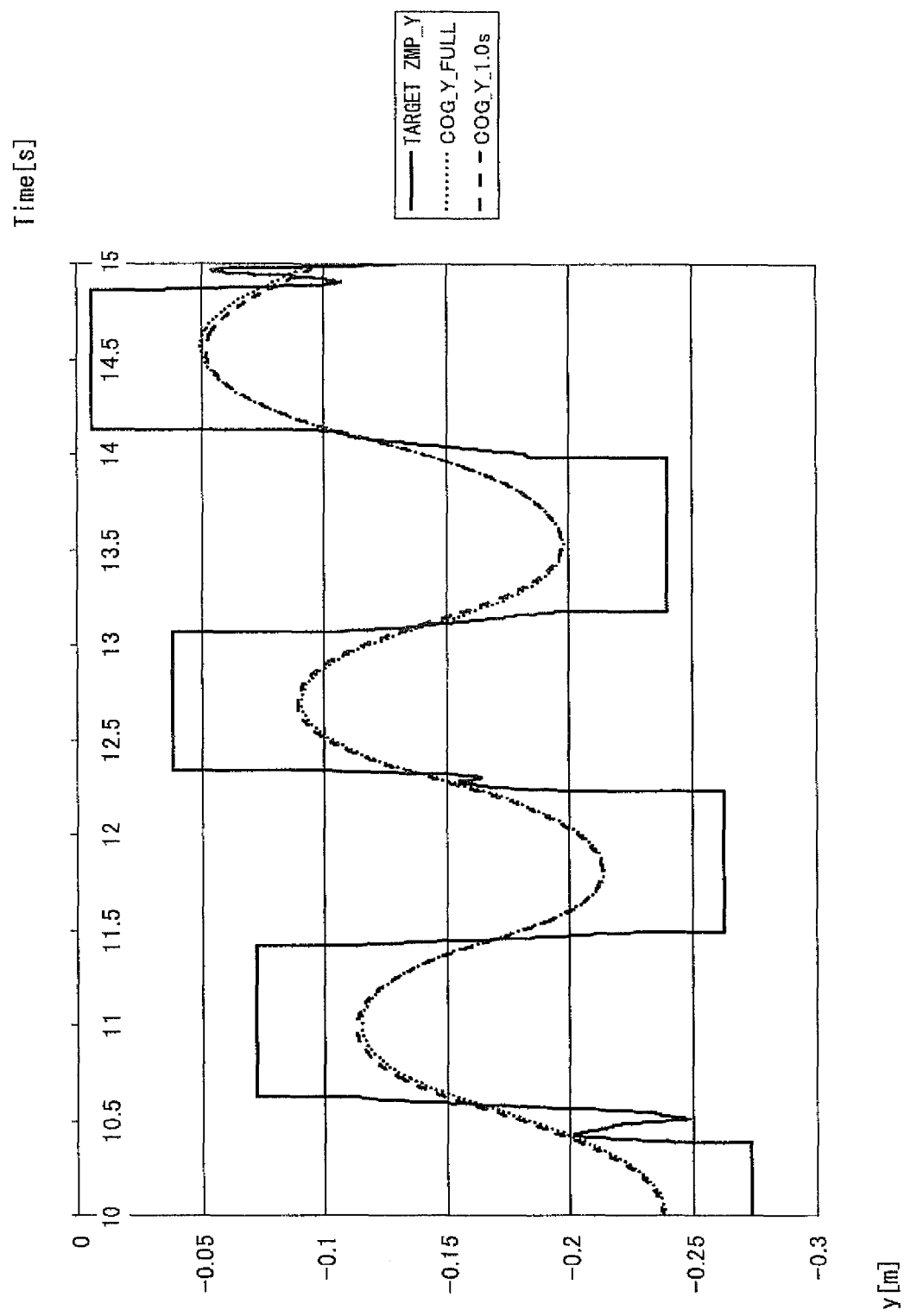
FIG. 14 is a view showing an experimental result according to this embodiment.

Given this concern, FIGS. 13 and 14 show results of plotting results of comparing the center of gravity trajectory when performing stabilization using model predictive control in the case of updating the backend of the prediction period buffer (1.6 sec) and the case of updating the position that is later than the head of the prediction period buffer by 1.0 sec as the update position on graphs along x and y directions with the target ZMP. The experimental conditions are: one step is about 0.8 sec and the length of step is about 10 cm to 20 cm. In FIGS. 13 and 14, "COG_Z_FULL" indicates the center of gravity trajectory in the case where the update position is at the backend, and "COG_Z_1.0s" indicates the center of gravity trajectory in the case where the update position is at the position that is later than the head of the prediction period buffer by 1.0 sec. Note that FIG. 13 shows a change in the center of gravity trajectory along the x-axis, and FIG. 14 shows a change in the center of gravity trajectory along the y-axis.

There is no significant difference in the center of gravity trajectory that is generated from model predictive control in the graph, which tells that a difference in the update position of the prediction period buffer causes no significant problem in the stability of the robot 3 in this level of walking. This is because a weight is assigned to the future target value in both of preview control and model predictive control, and the contributing rate to the stability decreases as it becomes the far future.

Figure 15:
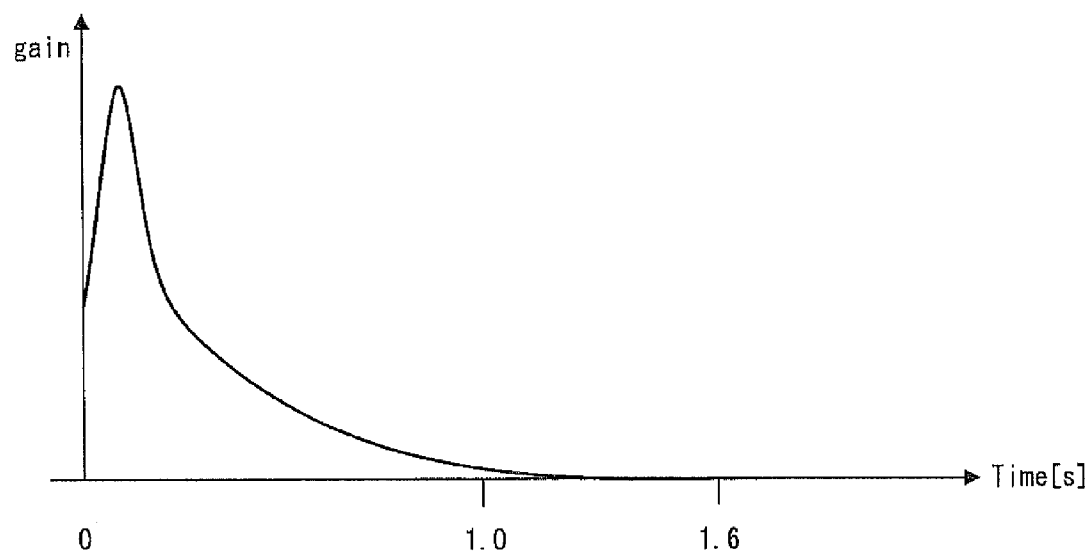
FIG. 15 is a view showing an example of a preview control gain.

FIG. 15 shows one example of a preview control gain. As shown in this graph, there is no significant influence by the future target value that is later than 1.0 sec, and stabile walking is practically possible using the generated center of gravity trajectory with use of any of a simulator and a real humanoid robot.

Further, in this embodiment, because the idling leg trajectory is updated by going back from the update position to the head of the prediction period buffer, there is a case where the position just after the head of the prediction period buffer is changed. There is thus a slight concern that a change in the moment about the center of gravity has a negative influence on the stabilization. However, because the target ZMP that has a dominant influence is generated from the operation information as needed and reflected on the update position of the prediction period buffer, an influence of a change in the idling leg trajectory is relatively very small.

As described above, because it is possible to generate the center of gravity trajectory with accuracy that is almost equal to the case of using the whole range of the prediction period buffer as shown in FIG. 13 and FIG. 14 in this embodiment, an advantage that enables intuitive operation of the lower limb with a small delay of one second is significantly greater than a disadvantage of having a negative influence on stabilization.

<5. Advantageous Effects of Embodiment>

(1. Intuitive Operation Using Weights of Both Legs of Operator)

Figure 16:
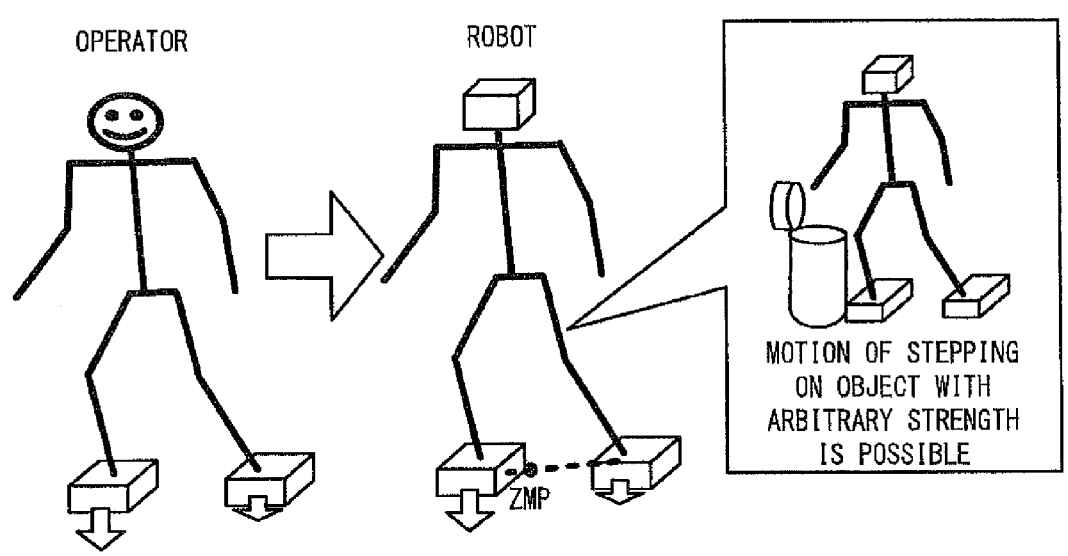
FIG. 16 is a view showing an image of intuitive operation of a robot according to this embodiment.

In this embodiment, the target ZMP of the robot 3 is controlled in accordance with the ratio of the right leg weight and the left leg weight of the operator. In other words, the target ZMP when the biped walking robot 3 produces the weights having the ratio of the right leg weight and the left leg weight of the operator is calculated. Therefore, as shown in FIG. 16, the operator can intuitively control the amount of weights of the right leg and the left leg of the robot 3 by the amount of weights of the right leg and the left leg of him/herself as shown in FIG. 16. For example, as shown in FIG. 16, a variety of motions such as causing the robot 3 to step on the foot pedal of a trash box (pedal pail) whose lid opens when the foot pedal is pressed down with arbitrary strength can be made.

Figure 17:
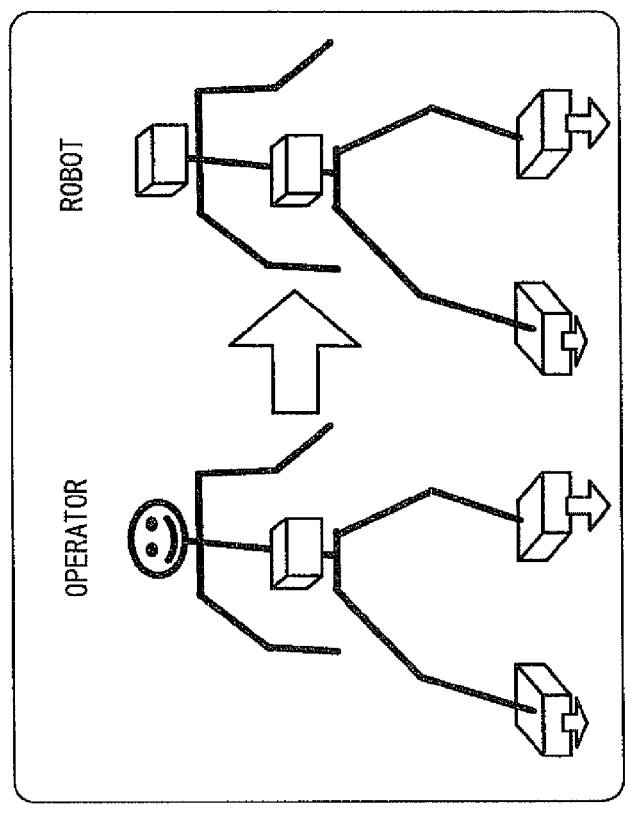
FIG. 17 is a view showing an image of intuitive operation of a robot according to this embodiment.
Figure 17:
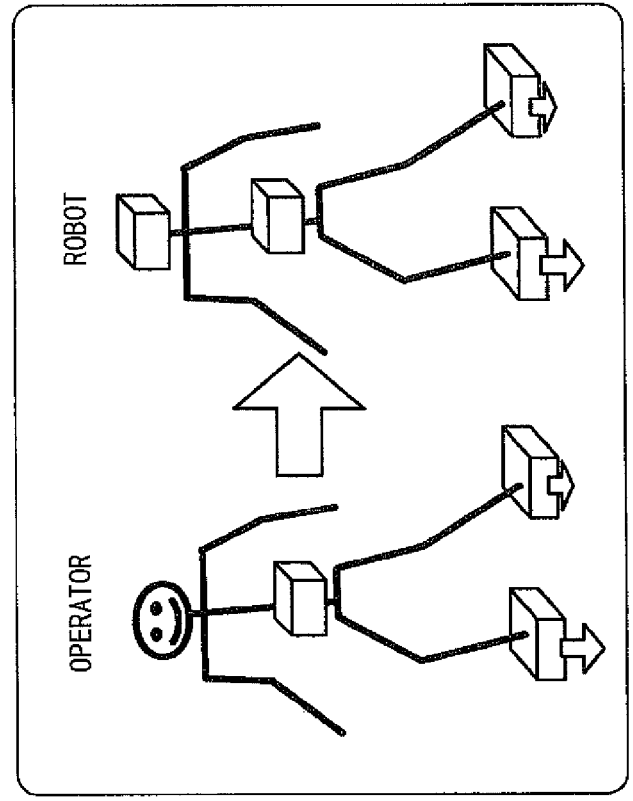
Figure 18:
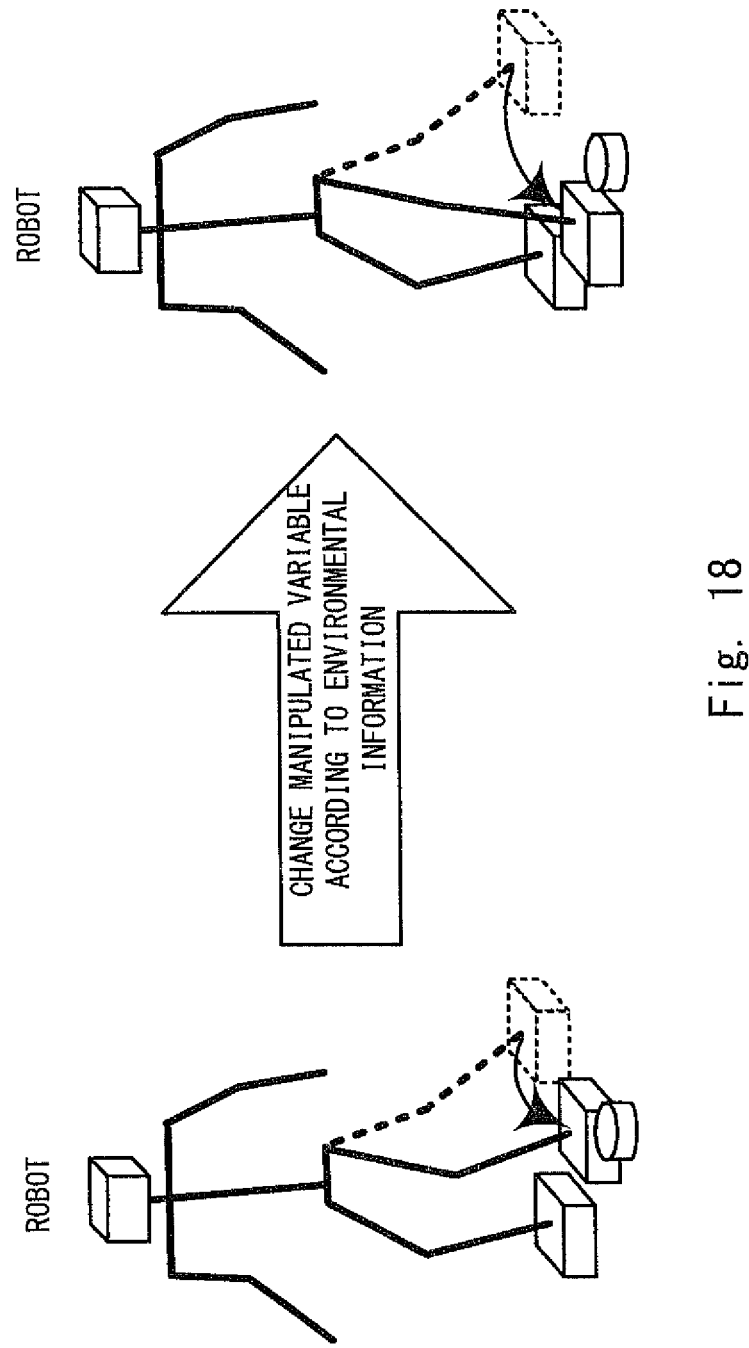
FIG. 18 is a view showing an image of obstacle avoidance of a robot according to this embodiment.

Further, in this embodiment, the hip posture of the robot 3 is controlled in accordance with the ratio of the right leg weight and the left leg weight of the operator and the postures of the right leg and the left leg. Therefore, as shown in FIG. 17, the operator can intuitively control the orientation of the upper body of the robot 3 by the amount of weights and the leg postures of the right leg and the left leg of him/herself as shown in FIG. 17.

(2. Simple Master Device Structure)

In this embodiment, it is possible to control the robot 3 if the amount of weights of both legs of the operator and the relative position/posture between both legs when the idling leg is landing can be acquired. There is thus no need for a structure that feeds back somatic sensation of the robot 3 to the operator as in Patent Literature 1, for example. Further, if the amount of weights of both legs of the operator and the relative position/posture between both legs when the idling leg is landing can be measured, motion capture devices and force plates are not necessarily required. A simple structure can be thereby achieved.

(3. Easy and Flexible Change in Idling Leg Trajectory and Landing Position)

In this embodiment, the idling leg trajectory is determined at the timing of landing of the idling leg. Therefore, compared with the control that reflects motion capture results on the idling leg trajectory as needed, it is possible to control the landing position of the robot 3 in a simple manner. Further, compared with the control that reflects motion capture results on the idling leg trajectory as needed, it is possible to very easily change the landing position by self-interference avoidance processing and floor recognition results. For example, in the case of control that reflects motion capture results on the idling leg trajectory as needed, the idling leg trajectory of the operator is faithfully copied even if it is the idling leg trajectory that causes self interference of the robot 3, and consequently the robot 3 suffers from self-interference. On the other hand, in this embodiment, because only the landing position is reflected as the operation of the operator, it is possible to arbitrarily derive the idling leg trajectory that avoids self-interference. Further, in the case of control that reflects motion capture results on the idling leg trajectory as needed, even if it can be recognized that there is an obstacle at the landing position when the idling leg is landing, because the idling leg of the robot 3 is already moving along the idling leg trajectory that faithfully reflects the idling leg trajectory of the operator, abrupt modification of the idling leg trajectory cannot be made at the time of landing, failing to avoid the obstacle in some cases. On the other hand, in this embodiment, if a sensor or the like (for example, a camera or the like) that can recognize the surrounding environment is mounted on the robot 3, for example, it is possible to modify the idling leg trajectory at a time when it is recognized that there is an obstacle at the landing position of the robot 3 corresponding to the landing of the idling leg of the operator, thus facilitating obstacle avoidance.

(4. Quick Operation Response)

In this embodiment, the target ZMP of the robot 3 is controlled in accordance with the ratio of the right leg weight and the left leg weight of the operator. Therefore, when the operator raises one leg, the target ZMP has completely moved to the position on the supporting leg. This eliminates the need for setting a transition period that allows the target ZMP to move to the position on the supporting leg, and it is thereby possible to improve the system response.

Further, in this embodiment, because the update position of the prediction period buffer is set at the middle position, walking operation is possible with a small delay of about one second, taking the operation stability into consideration. This also contributes to improvement of the response since update of the future target values is done effectively.

(5. Operable by Sitting Operator)

In this embodiment, the relative positions/postures of the supporting leg and the idling leg when the idling leg is landing is focused on as the position/posture of the foot of the operator, as described in the idling leg trajectory generation processing in S13. Therefore, in the state where the idling leg is raised (one-leg supporting state) or in the two-leg supporting state, no influence is exerted on the motion of the robot 3 when the operator slides the supporting leg over the floor.

Figure 19:
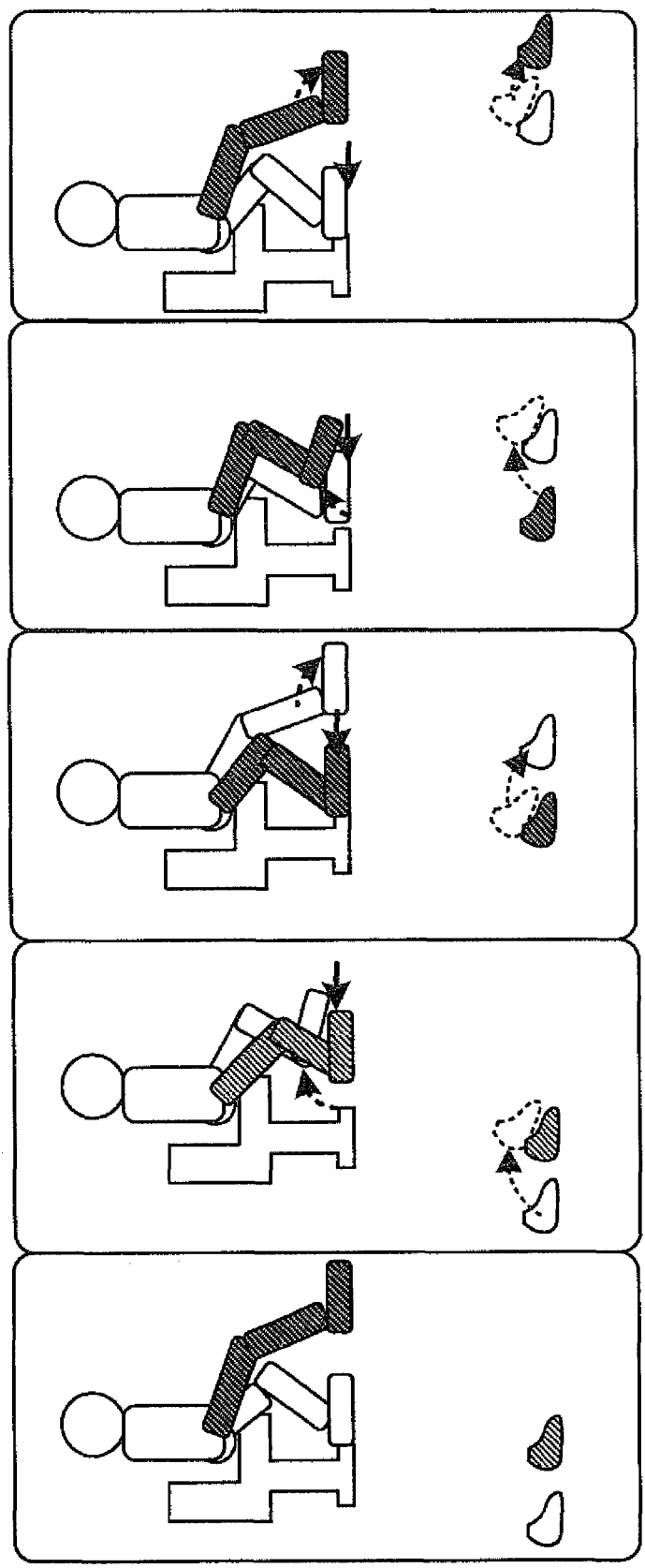
FIG. 19 is a view showing an example in which a sitting operator controls a robot according to this embodiment.

Using this, as shown in FIG. 19, the operator can control the robot 3 to keep moving forward by repeating the operation that slides the supporting leg backward when raising the idling leg and then moves the idling leg forward, while being seated. Likewise, when changing the hip posture and when making the rotating motion, control can be made by sliding the supporting leg while being seated.

It is thereby possible to make the robot 3 in motion over an infinitely wide area even when an area which the operator requires for operation is narrow. Further, for detailed operation, the operator can stand up again and make control by adjusting the length of step to the usual intervals of steps.

<6. Modified Example of Embodiment>

(1. Modification of Target ZMP of Remaining Part of Prediction Period Buffer)

In the above description, the data from the update position of the target ZMP trajectory to the end is used by being filed with the same target ZMP as at the update position in the prediction period buffer as shown in FIG. 12. However, the following ways are also possible.

(A) Correction is made to gradually bring the target ZMP after the update position to the center part of the both legs.

(B) Correction is made by estimating the future trajectory from the previous trajectory of the target ZMP.

(2. Reflection of Idling Leg Motion of Operator as Needed)

In the above description, the idling leg trajectory is calculated upon landing of the idling leg of the operator, and the prediction period buffer is overwritten at a time. On the other hand, the idling leg position/posture of the operator may be reflected on the update position of the prediction period buffer of the robot 3 as needed. In this case, the idling leg trajectory is not generated by polynomial interpolation, and the idling leg of the robot 3 moves as the idling leg of the operator moves. This is slightly effective for stability because there is no restriction on the idling leg period and the idling leg trajectory at the position near the head of the prediction period buffer is not changed. However, if high frequency noise enters into a measurement result of the foot position/posture of the operator, the driving speed of the joints of the robot 3 becomes excessive immediately. Further, many restrictions are imposed such as it is necessary to consider self-interference and joint angle limits of the robot 3 at all times. Therefore, the above-described technique of generating the idling leg trajectory at a time is more user friendly and more effective when performing the motion in accordance with the recognition result as described above, in consideration of the current capacity of the computing machine.

It should be noted that the present invention is not restricted to the above-described embodiment, and various changes and modifications may be made without departing from the scope of the invention.

For example, although the case of controlling a biped walking robot is described in the above embodiment, the present invention is not limited thereto. For example, the present invention may be applied to the case of controlling CG (Computer Graphics) characters.

Further, although the target ZMP when the biped walking robot 3 produces the weights having the ratio of the right leg weight and the left leg weight of the operator is calculated in the above embodiment, it is not limited to the case where the ratio of the right leg weight and the left leg weight of the operator and the ratio of the right leg weight and the left leg weight of the biped walking robot 3 totally match.

Further, although the measurement PC 6 transmits the operation information to the robot 3, and the robot CPU 8 calculates the target values based on the received operation information in the above embodiment, the present invention is not limited thereto. For example, the measurement PC 6 may calculate the target values from the operation information and transmit them to the robot 3, and the robot CPU 8 may store the received target values into the prediction period buffer.

Further, in the above embodiment, the determination on the two-leg supporting state (S3) and the determination on lifting (S4, S6) are performed in one cycle (from S2 to S17) of processing for convenience of description. However, it is of course feasible to perform processing to determine the operation state in the previous cycle in the determination on the two-leg supporting state (S3), and determine the operation state by the operation information received in the current cycle in the determination on lifting (S4, S6), setting the unit of receiving the operation information by the robot 3 as one cycle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A biped walking robot control method for master-slave control of walking of a biped walking robot, comprising:
    a weight detection step of detecting weights applied to a ground respectively by a right leg and a left leg of an operator;
    a target ZMP calculation step of calculating a target ZMP based on the detected right leg weight and left leg weight, and a right leg position and a left leg position of the biped walking robot so that a ratio of the detected right leg weight and left leg weight becomes equal to a ratio of the right leg weight and left leg weight of the biped walking robot; and
    a control step of controlling the biped walking robot in accordance with the calculated target ZMP.

2. The biped walking robot control method according to claim 1, further comprising:
    a detection step of detecting one step by the operator from a change in the detected right leg weight and left leg weight; and
    an idling leg trajectory calculation step of calculating an idling leg trajectory for one step of the biped walking robot corresponding to the step by the operator from the right leg weight and left leg weight detected when the one step by the operator ends, wherein
    the control step further controls the biped walking robot to walk along the calculated idling leg trajectory.

3. The biped walking robot control method according to claim 2, wherein
    the idling leg trajectory calculation step generates idling leg trajectory information indicating the idling leg trajectory in a size corresponding to an idling leg period of one step by the operator and stores the idling leg trajectory information into a buffer,
    the control step controls the biped walking robot in accordance with the idling leg trajectory indicated by the idling leg trajectory information stored in the buffer,
    the biped walking robot control method further includes an idling leg period calculation step of calculating an idling leg period of one step by the operator from a change in the detected right leg weight and left leg weight, and
    when the calculated idling leg period is longer than an upper limit of a time period for storing the idling leg trajectory information into the buffer, the idling leg period calculation step generates the idling leg trajectory information after correcting the idling leg period to meet the upper limit.

4. The biped walking robot control method according to claim 2, further comprising:
    an idling leg period calculation step of calculating an idling leg period of one step by the operator from the detected right leg weight and left leg weight, wherein
    when the calculated idling leg period is shorter than a lower limit of a time period for the biped walking robot to reproduce one step corresponding to the one step by the operator, the idling leg period calculation step generates the idling leg trajectory after correcting the idling leg period of the one step by the operator to meet the lower limit.

5. The biped walking robot control method according to claim 2, further comprising:
    an idling leg period calculation step of calculating an idling leg period of one step by the operator from the detected right leg weight and left leg weight, wherein
    when the calculated idling leg period is shorter than a lower limit of a time period for the biped walking robot to reproduce one step corresponding to the one step by the operator, the idling leg period calculation step invalidates the one step by the operator.

6. The biped walking robot control method according to claim 1, further comprising:
a hip posture calculation step of calculating a hip posture around a vertical axis of the biped walking robot as a posture obtained by combining postures of a right leg and a left leg of the biped walking robot in accordance with a ratio of weights from the detected right leg weight and left leg weight, wherein
the control step further controls the biped walking robot to achieve the calculated hip posture.

7. A biped walking robot control system serving as a master for master-slave control of walking of a biped walking robot serving as a slave, comprising:
a weight detection unit that detects weights applied to a ground respectively by a right leg and a left leg of an operator;
a target ZMP calculation unit that calculates a target ZMP based on the detected right leg weight and left leg weight, and a right leg position and a left leg position of the biped walking robot so that a ratio of the detected right leg weight and left leg weight becomes equal to a ratio of the right leg weight and left leg weight of the biped walking robot; and
a control unit that controls the biped walking robot in accordance with the calculated target ZMP.

* * * * *